United States Patent
Hillen et al.

(10) Patent No.: US 9,911,226 B2
(45) Date of Patent: Mar. 6, 2018

(54) METHOD FOR CLEANING OR PROCESSING A ROOM BY MEANS OF AN AUTONOMOUSLY MOBILE DEVICE

(71) Applicant: Vorwerk & Co. Interholding GmbH, Wuppertal (DE)

(72) Inventors: Lorenz Hillen, Wuppertal (DE); Martin Meggle, Herzebock (DE); Jenny Scheffel, Cologne (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 245 days.

(21) Appl. No.: 14/804,423

(22) Filed: Jul. 21, 2015

(65) Prior Publication Data

US 2016/0027207 A1    Jan. 28, 2016

(30) Foreign Application Priority Data

Jul. 22, 2014 (DE) .................. 10 2014 110 265

(51) Int. Cl.
| | |
|---|---|
| *G06T 17/00* | (2006.01) |
| *A47L 11/40* | (2006.01) |
| *G06T 7/00* | (2017.01) |
| *G05D 1/00* | (2006.01) |
| *G05D 1/02* | (2006.01) |

(Continued)

(52) U.S. Cl.
CPC .......... *G06T 17/00* (2013.01); *A47L 11/4011* (2013.01); *G05D 1/0016* (2013.01); *G05D 1/0274* (2013.01); *G06T 7/50* (2017.01); *G06T 7/74* (2017.01); *A47L 2201/04* (2013.01); *A47L 2201/06* (2013.01); *G05D 2201/0203* (2013.01); *G06T 2200/08* (2013.01); *G06T 2207/10004* (2013.01); *G06T 2207/10028* (2013.01); *G06T 2207/30244* (2013.01)

(58) Field of Classification Search
CPC .. G06T 17/00; G06T 7/50; G06T 7/70; G06T 7/73; G06T 7/74; G06T 7/75; G06T 7/77; G05D 1/0016; G05D 1/0274
See application file for complete search history.

(56) References Cited

U.S. PATENT DOCUMENTS

| | | | |
|---|---|---|---|
| 5,815,880 A | 10/1998 | Nakanishi | |
| 2010/0228394 A1* | 9/2010 | Yi | ........................ G05D 1/0246 700/253 |

(Continued)

FOREIGN PATENT DOCUMENTS

| | | |
|---|---|---|
| DE | 102 42 257 A1 | 4/2003 |
| DE | 103 57 637 A1 | 7/2005 |

(Continued)

OTHER PUBLICATIONS

European Search Report in EP 15 17 8218 dated May 11, 2016.
European Search Report in EP 15 17 8218 dated Sep. 6, 2016.

*Primary Examiner* — Adam R Mott
(74) *Attorney, Agent, or Firm* — Collard & Roe, P.C.

(57) ABSTRACT

A method for cleaning or processing a room uses an autonomously mobile device. In order the relieve the user of the task of finding the exact subarea to which the device must travel, or avoid, on a map of the room, the user in order to select a subarea takes a photograph of the subarea and transmits it to a processing unit. In this way a method is provided that is less time-consuming and more convenient for the user.

18 Claims, 3 Drawing Sheets

(51) Int. Cl.
G06T 7/73 (2017.01)
G06T 7/50 (2017.01)

(56) References Cited

U.S. PATENT DOCUMENTS

| | | | | |
|---|---|---|---|---|
| 2013/0275164 | A1* | 10/2013 | Gruber | G10L 17/22 |
| | | | | 705/5 |
| 2013/0326839 | A1* | 12/2013 | Cho | A47L 9/2805 |
| | | | | 15/319 |
| 2014/0166047 | A1 | 6/2014 | Hillen et al. | |
| 2014/0303775 | A1* | 10/2014 | Oh | G05D 1/0016 |
| | | | | 700/253 |
| 2014/0316636 | A1* | 10/2014 | Hong | G05D 1/0016 |
| | | | | 701/27 |
| 2014/0316841 | A1* | 10/2014 | Kilby | G06Q 10/06316 |
| | | | | 705/7.26 |

FOREIGN PATENT DOCUMENTS

| | | |
|---|---|---|
| DE | 10 2008 014 912 A1 | 9/2009 |
| DE | 10 2009 024 990 A1 | 12/2010 |
| DE | 10 2009 059 217 A1 | 2/2011 |
| DE | 10 2009 052 629 A1 | 5/2011 |
| DE | 10 2010 000 174 A1 | 7/2011 |
| DE | 10 2010 015 941 A1 | 9/2011 |
| DE | 10 2010 016 553 A1 | 10/2011 |
| EP | 2 471 426 A2 | 7/2012 |
| EP | 2 741 483 A2 | 6/2014 |
| WO | 2005/055795 A1 | 6/2005 |

* cited by examiner

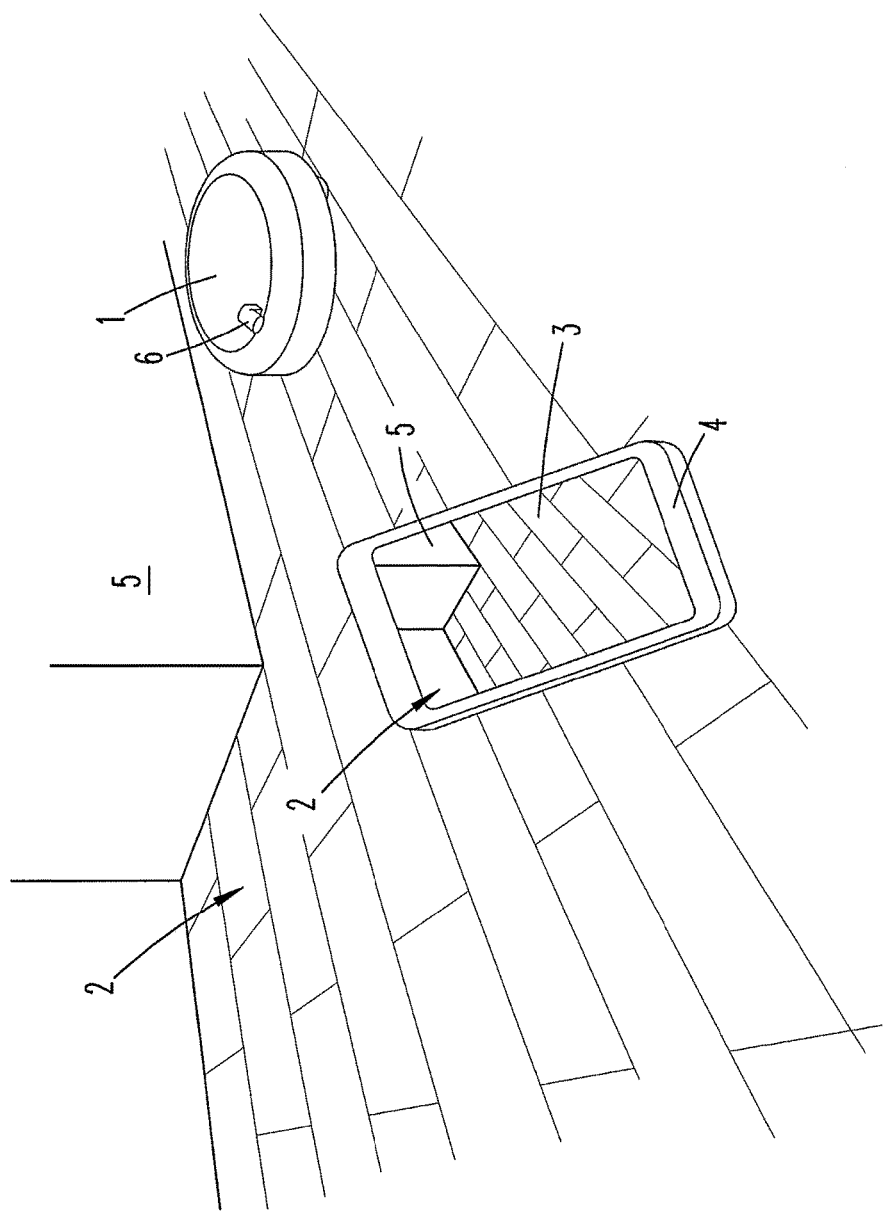

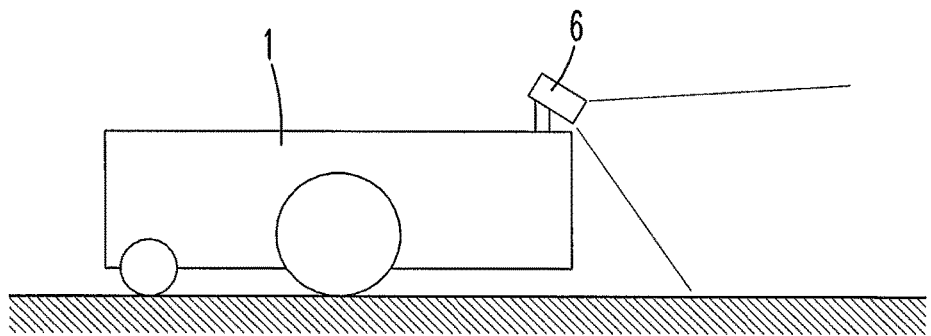
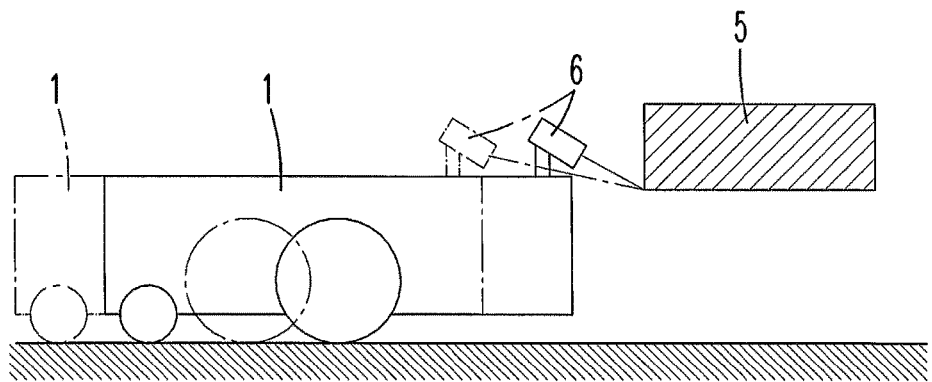

METHOD FOR CLEANING OR PROCESSING A ROOM BY MEANS OF AN AUTONOMOUSLY MOBILE DEVICE

CROSS REFERENCE TO RELATED APPLICATIONS

Applicant claims priority under 35 U.S.C. § 119 of German Application No. 10 2014 110 265.7 filed Jul. 22, 2014, the disclosure of which is incorporated by reference.

BACKGROUND OF THE INVENTION

1. Field of the Invention

The invention relates to a method for cleaning or processing a room by means of an autonomously mobile device, wherein the method includes the following steps:
Creating a map of the room,
Storing the map of the room in a data memory,
Selection of a subarea of the room by the user,
Transmitting the location data of the selected subarea to a processing unit connected to the data memory,
Comparing the location data of the selected subarea with the location data contained in the map to enable the processing unit to identify the subarea,
Cleaning or processing the room taking into account a user command regarding the selected subarea.

2. Description of the Related Art

Methods of the kind described above are sufficiently well known in the prior art. The device used for cleaning or processing a room moves autonomously according to a pre-programmed travel and optionally also cleaning/processing strategy. In this context, it is also known that the device is equipped with a map or map-like representation of the room to be cleaned or processed, optionally multiple maps for a corresponding number of rooms. Said map is preferably stored in a non-volatile memory. In particular, the location data for obstacles, such as boundary walls, or also furniture, is marked in the map or the map-like representation. In order to capture the data for the room, it is further known to operate the device in the context of a teaching run, during which the map is also created. Additionally, the map may also be updated in the course of subsequent runs, so that it can capture rearranged furniture, for example. For this purpose, the device is equipped with means for capturing the room that are capable of detecting the location data of the room, particularly the obstacles. In this regard, reference is made to DE 102008014912 A1, which discloses a cleaning device with an all-round scanner. In detail, the obstacle detection function disclosed therein is based on an optical triangulation process that measures distances to obstacles, which are then used to create a map of the room. A method for creating a map with location information is disclosed in DE 102010000174 A1, for example. Alternatively or additionally to distance measurements, it is also known from the related art to create maps from single images taken with a camera, in the manner of a mosaic, for example.

In order to steer a device known from the prior art to a specific subarea of the room, so that it can carry out locally limited cleaning/processing there, for example, or to block said area entirely for cleaning/processing, methods are also known in the prior art in which the user can direct the device to a desired subarea manually with the aid of a remote control, or select a desired subarea on the map as the target location. With regard to the locally limited cleaning (spot cleaning), the user can use a remote control, for example, to steer the device to the site that is to be cleaned, with the aid of arrow keys, for example. Alternatively, the user may also carry the device to the site, and there press a button on the device to initiate local cleaning. On the other hand, in order to show the device which local subareas it must not enter, separate "no entry markers" are set, for example, such as magnetic strips or IR beacons.

Methods are also known in which a user controls the device remotely with the aid of a mobile end device, such as a smartphone. In such cases, a current photograph of the room taken by a camera on the cleaning or processing device and/or a map stored in a data memory in the device may be displayed on the mobile end device. The user can select and/or mark subareas of the room that are to be cleaned/processed, or also subareas that are to be avoided. In the case that local cleaning is desired, the device may travel to the subarea itself, for example, without the user having to monitor or control its movement. In this regard, reference is made to documents DE 102009024990 A1 and DE 102009052629 A1, for example.

The disadvantage of the methods described in the preceding is that the user himself must find the subarea of the room to which the device must travel or which it must avoid on the map. To do this, the user directs the device to the desired room subarea, for example using arrow keys on a remote control, also on a mobile end device, for example. This is often inaccurate, and corrections have to be made, or the user must be particularly experienced in the use thereof to ensure that the device will travel precisely to the desired subarea. In such circumstances, the device does not travel to the subarea automatically, but instead the user must control the device until it reaches the desired subarea of the room. In the event that images from the device camera or a map of the room are displayed on a mobile end device, the user must also find and select the desired subarea on the map. When doing so, the user has to orientate himself on the map constantly, and find the desired subarea. This is time-consuming and inconvenient, particularly for users with little experience.

SUMMARY OF THE INVENTION

It is therefore the object of the present invention to provide a device for cleaning or processing a room by means of an autonomously mobile device, in which the user no longer needs to find the exact desired subarea to which the device must travel, or the subarea it must avoid. Accordingly, a method is to be created that is less time-consuming and can be carried out more conveniently for the user.

In order to solve the object as stated above, a method for cleaning or processing a room by means of an autonomously mobile device is provided, including the method steps:
Creating a map of the room,
Storing the map of the room in a data memory,
Selection of a subarea of the room by a user,
Transmitting the location data for the selected subarea to a processing unit connected to the data memory,
Comparing the location data for the selected subarea with the location data contained in the map for identification of the subarea by the processing unit,
Cleaning or processing the room taking into account a user command with regard to the selected subarea, wherein
the user creates a photograph of the subarea for selection and transmits it to the processing unit.

In the configuration according to the invention, the user can simply instruct the device simply which subareas of the room are to be cleaned, or alternatively, avoided. To do this, the user creates a photograph of the desired subarea and sends it to the processing unit, which may be installed in the autonomously mobile device, for example, or equally in an external computer system. Said processing unit compares the photograph with map of the room stored in the data memory. The processing unit can then plan a route to the desired subarea that enables the device to travel to the subarea or to avoid it during its mobile activity. Particularly for the purposes of avoidance, the selected subarea may also be stored, so that it can also be avoided in the course of future cleaning or processing activities. The device then travels bypasses the selected subarea accordingly. Thus in general, simple, timely user/device interaction is possible, by which the user can instruct the device as to which subareas of the room should be cleaned or processed particularly intensively, or avoided altogether. The only command required for this is a photograph of the selected subarea, created by the user. In this way, according to the invention, no additional remote control is needed to direct the device. Moreover, it is also not necessary for the user himself to locate and find the subarea for selection in the map stored in the data memory.

In the context of the invention, it is further provided that the user creates the photograph with the aid of a mobile end device, particularly a mobile telephone. As an alternative to a mobile telephone, particularly a smartphone, the method may also be carried out using a tablet PC, a separate digital camera or the like. The photograph is advantageously transmitted wirelessly to the processing unit via a wireless network connection, particularly WLAN or Bluetooth. However, it is also possible for the location data of the selected subarea to be stored in a mobile data memory, for example a memory card of the mobile end device before it is transmitted to the processing unit, which memory card is then connected to the processing unit for transmission of the data.

It is provided that after identification the device travels to the selected subarea and performs its cleaning or processing tasks there. For this purpose, the location data for the selected subarea is first compared with the location data stored in the map. Various methods known from the prior art may be used for comparing the location data. For example local image features (location data) may be detected in the photograph created by the user and searched for on the map. In this context, it is advisable to use image features that are relatively unaffected by changes in the camera perspective and/or orientation, the viewing angle, or changes in the lighting conditions. Alternatively to a search of local image features, it is also possible to launch a search for a given photograph in a set of known single images (usually in an image database), in which case the most similar image or images in each case will be found. According to the suggested method, the image to be searched for is the photograph created by the user of the subarea that is to be cleaned or avoided. The image database advantageously corresponds to the map of the room stored in the data memory. According to the method, algorithms are used to search for the selected subarea on the map, and the target location, or at least a target region that is to be cleaned intensively or avoided during cleaning, is determined. Then, a corresponding route to said subarea is calculated. Alternatively, the location data for the selected subarea is stored in the processing unit, and excluded from the room cleaning or processing activities to be carried out by the device.

It is suggested that the map of the room should be stored in a data memory of the device. This is recommended particularly if the device itself captures the location data required for creating the map as it travels about the room in the course of a normal movement strategy. In this context, it is advisable for the device not to carry out cleaning or processing activities at the same time as it is collecting location data. In a further variation, it is also possible that the map of the room is not stored on the device itself, but in an external database, for example, or in a data memory of the user's mobile end device.

It is further provided that the location data of the selected subarea and the location data contained in the map are compared by means of a processing unit of the device or of a different end device belonging to the user, particularly a mobile telephone. In further variants, it is also possible for a corresponding comparison to be carried out using a base station of the device, or via networked domestic appliances, as is now common practice for multimedia applications. In this regard, the user might use a separate digital camera, not a camera built into a mobile telephone, for example, to create a photograph of the subarea to be cleaned. This photograph might be transmitted initially to the device, which would then send both the map of the room stored on the device and the photograph to a television, which executes the necessary computing steps as part of the identification of the selected subarea. In this context, it is of course also possible for the digital camera or the mobile end device, a smartphone or example, to send the photograph to the television directly.

According to a further embodiment, the location data for the selected subarea may also be stored on an external computing system, to which both the user's end device and the device for cleaning or processing the room can connect. This solution is particularly advantageous if a powerful computing system is required, and cannot be provided by the user's mobile end device or the device for cleaning or processing the room.

It is further provided that if the subarea cannot be identified unambiguously, the user may manually choose from several possible subareas and/or specify the location data for the selected room more precisely. Ideally when the location data for the selected subarea is compared with the map location data, only one subarea that is identical or as similar as possible is found on the map. However, it does happen that the subarea chosen by the user cannot be identified unambiguously on the stored map. In this case, several possible subareas that more or less match his selected subarea are offered to the user to make a choice. The user can choose from these various suggested subareas, or specify the location data more closely, for example by providing more detailed information about the size and position of the subarea that is to be cleaned or avoided. To this end, the map may advantageously be displayed on his mobile end device for example. The display may be movable, rotatable, resizable or otherwise capable of manipulation. The alternatively calculated subareas that match the location data of the selected subarea most closely may be marked on the map, so that the user only has to choose one of these areas. The map may also be used to enable the user to correct or specify the desired subarea more closely. To this end, he can mark the size and position of the area to be cleaned or avoided in the map, for example.

It is recommended that the location data contained in the map include three-dimensional information, particularly information about obstacles in the room. With this configuration, it is possible to overcome the drawback that arises when the map was created by the device using a different viewing angle of the room from that used when the user took the photograph. The device typically delivers a "frog perspective" as it were, from low to the ground, whereas the perspective of the user, and thus of the photo, usually reflects the "bird's eye perspective. Furthermore, the device is also able to access subareas of the room that the user cannot see. These include for example subareas under cupboards, beds or the like. Therefore, in order to help the user orientate himself better in the map prepared from the perspective of the device, three-dimensional information relating to the height of obstacles, objects the device travels under, for example, may be displayed. For this purpose, it may be helpful to classify the obstacles in groups, such as "close to the ground", i.e., travel underneath is not possible, "low" (under beds), "medium" (under chairs) and "high" (under tables for example).

In addition, it is suggested within the scope of the invention that the map of the room be created by the device, wherein a camera on the device takes single images of adjacent subareas, which are then arranged together when the map is created. The map is thus created from the location data of adjacent subareas of the room, although in general different methods are possible for creating the map. It is suggested that the map be pieced together in the manner of a "mosaic map", wherein the methods of "simultaneous localization and mapping" and "visual odometry" may be used. Alternatively to "mosaic cards", the map may also have the form of a panoramic photograph created by joining multiple single images together.

In the related art, the aforementioned "mosaic maps" are used particularly in submarine robotics applications for mapping seabed, or as air imagery maps. In order to create the map, techniques known from "simultaneous localization and mapping (SLAM)" and panoramic photography are used, for example. In order to identify the current location of the device, the current image must be compared with the mosaic map and a position estimated. Known methods based on local image features as well as image search algorithms are used for this.

The aforementioned simultaneous localization and mapping methods are characterized in that they locate the device in the map as the map is being created, expanded or improved. For this purpose, sensor data fusion methods are used. Improvements in position estimation as well as map correction are obtained when the device returns to a site that is already known. The visual odometry methods, also referred to above, attempt to estimate the position of the device as accurately as possible by calculation. A map of the device's surroundings is often created as a by-product of this process. A common feature of all the methods described in the preceding is that the single images captured by the device are connected together to produce a consistent, i.e., geometrically correct, mosaic map, and that the current location information for the device can be estimated during the mapping process. Such methods can significantly improve the quality of the map and the position estimation of the device, particularly if there are overlaps between the images from the current and the previous image capture.

In similar fashion to the compilation of mosaic maps, in panorama photography multiple single image are also combined to produce a high resolution panoramic photograph. Similar algorithms are used to compile the images for both panoramic photos and mosaic maps. Unlike the mosaic maps, however, panoramic photos do not reflect the bird's eye view of the ground level, but rather a perspective such as a human observer would have, for example.

As an alternative to the imaging methods for creating the map outlined in the preceding, it is also possible to create a map from location data that has not been captured with a camera, but detected using distance sensors (ultrasonic sensors/laser range finders).

It is provided within the scope of the invention that in order to produce the map, location data for the room is captured by means of the autonomously mobile device itself. Accordingly, the autonomously mobile device not only cleans or processes the room, it is also instrumental in creating the map. In general, said map may also be made available to other devices, so the same room does not need to be surveyed again in the same way.

Besides the methods for cleaning or processing a room, the invention also suggests an autonomously mobile device for cleaning or processing a room, wherein the autonomously mobile device has a data memory for storing a map of the room and a processing unit connected to the data memory, which is designed to be able to compare a photograph of a subarea transmitted to the processing unit for identification of the subarea with the stored map.

BRIEF DESCRIPTION OF THE DRAWINGS

In the following, the invention will be explained in greater detail with reference to an embodiment thereof. In the drawing:

FIG. 1 shows a subarea of a room with an autonomously mobile device and a mobile end device;

FIG. 4 shows an autonomously mobile device with a camera;

FIG. 5 shows the device of FIG. 4 working out the location data of an obstacle.

DETAILED DESCRIPTION OF PREFERRED EMBODIMENTS

Figure 3:
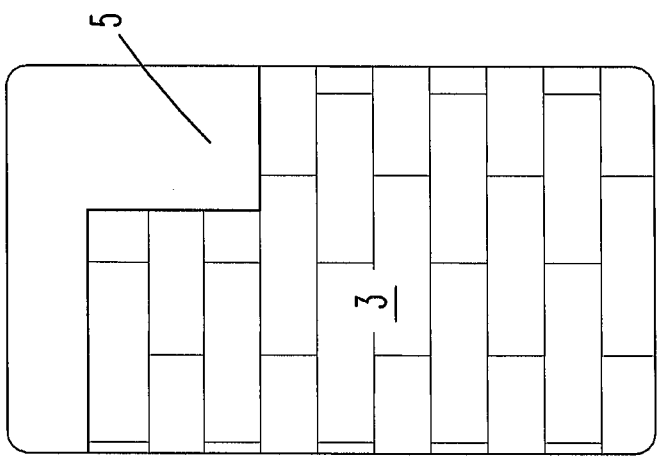
FIG. 3 shows the rectified photograph of FIG. 2.

The situation presented in FIG. 1 shows an autonomously mobile device 1, in this case a robot vacuum cleaner, for example, on a room floor surface that is to be cleaned. Device 1 is equipped with a camera 6 facing in the primary travel direction of device 1, so that the floor area in front of device 1 may be detected. The room part shown includes a subarea 2 of a room with an obstacle 5, specifically a wall. However, obstacle 5 may also be another object that device 1 is not able to negotiate, for example beds, cupboards and the like, the ground clearance of which is not higher than device 1, so device 1 cannot pass underneath these obstacles 5. A user (not shown) has a mobile end device 4, in this case represented as a smartphone for example, which is equipped with a camera (not shown) and software that is capable of producing a photograph 3 of a subarea 2. The photograph 3 taken with the user's mobile end device 4 may be displayed on end device 4 itself, for example, as is represented in FIG. 1.

Figure 2:
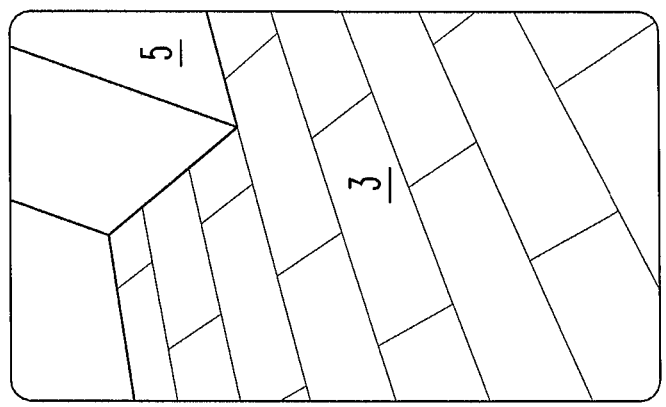
FIG. 2 shows a photograph with distorted perspective, taken with the mobile end device.

FIG. 2 shows an unprocessed version of the photograph 3 taken from end device 4. It is evident that the floor surface shown is distorted in terms of perspective, and further image processing is necessary.

FIG. 3 shows the subarea 2 of FIG. 2, but in a rectified version. The perspective distortions and imaging errors in photograph 3 have been rectified, yielding an undistorted, true-to-scale view of subarea 2. After processing in this way, photograph 3 corresponds to a view of subarea 2 from a viewing direction perpendicular to subarea 2.

FIG. 4 shows an outline side view of autonomously mobile device 1. In general, device 1 may be any kind of device 1 for cleaning or processing a room. In this case, for example, a robot vacuum cleaner is assumed. Device 1 is equipped with a camera 6, with which the surroundings of device 1 can be photographed or filmed, so that for example consecutive subareas 2 of a room may be recorded for mapping purposes.

FIG. 5 shows a situation in which device 1 approaches an obstacle 5. Two different, temporally sequential positions of device 1 in front of obstacle 5 are shown. These two positions are obtained with a time delay as device 1 approaches obstacle 5. The dashed version represents device 1 at an earlier point in time than the version represented with a solid line. Obstacle 5 may be the base area of a shelf, for example, which is raised above the floor surface by the height of the shelf legs. Device 1 is now able to check the height of obstacle 5 and determine whether device 1 is able to travel underneath obstacle 5. In the chronological sequence, device 1 moves from the position represented by the dashed line to the position represented by the solid line. In this process, obstacle 5 can be detected from various angles. The distance of obstacle 5 from camera 6 may be calculated from the angles and the distance traveled by device 1. This in turn may be used to determine the height of obstacle 5 relative to camera 6, so that a conclusion may be reached as to whether device 1 is able to pass beneath obstacle 5.

Although a device 1 with only a single (i.e., monocular) camera is described in the figures, other camera systems may also be used. To this end, for example, omnidirectional camera systems with a very wide horizontal field of view, typically 360° all-round vision, or stereo camera systems with two or more cameras may be used.

A particularly simple camera system may be created with a camera 6 that is directed perpendicularly to the floor. Then, camera 6 maps the floor from a vertical point of view, and the image processing step can be dispensed with. Such a camera 6 can easily be protected from environmental influences, so that for example constant lighting conditions may be achieved. With constant lighting conditions, it is easier to make maps from a plurality of single images collected by camera 6. However, since such a camera only sees the floor, it is not able to detect surrounding obstacles 5. The grouping of obstacles 5 into height categories according the invention would thus not be applicable.

Although in the past only imaging cameras 6 have been used, other sensors are also applicable within the terms of the invention, for example ultrasound sensors or laser distance sensors.

In the following, the individual method steps of the suggested method for cleaning or processing a room by means of the autonomously mobile device 1 will be explained in detail.

A device 1, for example, equipped with an on-board computer on which the calculations necessary for comparing the location data of the selected subarea 2 with the location data contained in the map for identifying subarea 2 is capable of carrying out the method. Mobile end device 4 may be for example a smartphone, a tablet PC or the like. Device 1 and mobile end device 4 communicate with each other via a wireless network connection, for example a wireless connection (WLAN or Bluetooth, etc.). In this context, autonomously mobile device 1 and the user's mobile end device 4 may communicate with each other directly (peer to peer connection) or by registering device 1 and end device 4 on a network, that is to say on an external computer system.

A map of the room must first be produced before it is even possible to compare the location data for selected subarea 2 with known location data for the room. The map is particularly advantageously a mosaic map, which is compiled from a number of single images and views the room floor from the bird's eye perspective. While the single images that are to form the map later are being collected, it is recommended to carry out a run of the device without cleaning/processing the room at the same time, to avoid damaging the subsurface if a wiping device is attached, for example. In this context, the user may for example instruct device 1 as to which subareas 2 of the room must not be cleaned, because they consist of hardwood flooring, for example. The creation of the map may particularly be divided into several substeps, which are explained in detail in the following.

Rectifying the single images: Since camera 6 is directed forwards in the direction of travel on device 1, the images of subarea 2 that are captured with camera 6 distorted in terms of perspective and are also subject to imaging errors, which are caused by the type of camera 6 used. Rectification eliminates these distortions and imaging errors, and an undistorted, true-to-scale view of subareas 2 is obtained. The image processing steps involved in rectification are known in the prior art and will therefore not be explained further here. A comparison of subareas 2 according FIGS. 2 and 3 reveals that the tiles are distorted in FIG. 2, and the floor is not shown as being at right angles to the wall (obstacle 5). Rectified photograph 3 according to FIG. 3 shows clearly that after rectification the tiles are parallel to each other and form a right angle with the wall (obstacle 5).

Compiling the single images to create a map: The map is produced by joining the single images together to make one whole image, hence the name "mosaic map". If no map exists at all at the start of mapping, the first single image taken will serve as the origin for purposes of adding further single images. The inclusion of a current single image in an existing map is called registration. Image registration algorithms typically operate in two stages. First it is determined at what point and in which orientation the single image is to be added. There are two possible approaches for determining this: Often, local image features are detected in the existing map and in the image to be added, and correspondences between the features of the two single images are calculated. Then, this position and orientation for inserting the current single image may again be calculated from the analysis of the correspondences. An estimate of the device movement, i.e., translation and rotation between the last single image inserted and the current single image may then be carried out to eliminate false (or implausible) correspondences. Alternatively, the position and orientation may be determined with search process and image comparisons: The current single image is compared with the existing map in multiple possible positions and multiple possible orientations. The combination of position and orientation that has resulted in the best match is then used as the result of the search. The search area may be defined more narrowly if an estimate of the device movement between the last image inserted and the current image is used.

In the second step, the new single image at the calculated position and the calculated orientation is inserted in the existing map. The brightness of the single image to be included may also be adjusted, so that the brightness of the resulting map appears as uniform as possible.

While autonomously mobile device 1 travels through the room that is to be mapped, single images are recorded at regular intervals along its travel path. The currently recorded single image is then rectified as described in the preceding, and incorporated in the map. A certain degree of overlap between the current single image and the existing map is advantageous in this process. Registering the current single image on the existing map makes it possible to calculate an estimate of the device position at the time the image was captured. This may serve either as the only position estimate, or it can be merged with position estimates derived from other sensor information (e.g., laser distance sensor).

Integrating information on the height of an obstacle 5: The map that is compiled from the single images contains only the rectified view of the floor from device 1. However, since device 1 also maps the floor in subareas 2 that are not visible to humans, e.g., under tables and beds, the user may find it difficult to work out what he is looking at in the mosaic map. It is therefore helpful to include additional information in the map, to make the map easier to read for the user. This might include for example additional height information regarding obstacles 5 the device travels under, or also obstacles 5 close to the floor which it cannot travel under. The height of the obstacles 5 the device travels under may be calculated by triangulation from two single images, for example, if the movement of device 1 between the locations where the single images were taken is known. This is shown in FIG. 5. In order to simplify the map display for the user, the height of obstacle 5 that is calculated by this method may be assigned to a pre-set category, for example "close to the ground" (travel underneath is not possible), "low" (under beds or cupboards), "medium" (under chairs), or "high" (under tables). Height indications may be colour coded on the map, for example. The map created in this way may be stored in device 1 itself, for example, but alternatively it is also possible to stored it on the user's mobile end device 4.

Locating photograph 3 of subarea 2 in the map: In order to show device 1 which area are of the room must be selectively cleaned/processed, or avoided in subsequent cleaning/processing sequences, the user takes a photograph 3 of the subarea 2 in question using his mobile end device 4. Photograph 3 is transmitted to device 1 via a wireless connection, for example. There, it is compared with the stored map of the room, and calculation is made as to which subarea 2 of the room is shown on photograph 3. Ideally, a subarea 2 of the room can be identified uniquely. However, ambiguities may arise, and the user intervene to eliminate, these, for example by choosing between several possible subareas 2 or specifying the location data of the subarea 2 he selected more precisely.

The comparison of the location data for selected subarea 2 with the location data contained in the map for identifying subarea 2 is carried out in similar fashion to the image registration described previously. In this process, the position determination is based for example on the calculation of matches between location data, such as local image features for example, or on a search process and comparison.

During the comparison, the location data, particularly local image features, in photograph 3 may be compared with the map, for example. The location data on the map is known, and/or must be calculated only once after the map has been created. Since the local image features as location data for example are typically unaffected by changes in scale (that is to say the size of the image feature in the image), rotation of the viewing angle, and to some degree even perspective distortions, they are particularly suitable for this comparison method.

In order to identify the subarea 2 selected by the user on the map, the photograph 3 taken by the user is compared with the map in various positions, in various orientations, and even with multiple perspective distortions. The position in the map for which the greatest correspondence is found, is then determined to be the position of subarea 2.

Eliminating ambiguities: Ideally, the photograph 3 taken by the user can be located as a specific subarea 2 on the map. However, the perspective or distance between the camera 6 on autonomously mobile device 1 and the subsurface may mean that the user's photograph 3 cannot be assigned uniquely to the map captured by autonomously mobile device 1. In this case, several possible subareas 2 may be calculated according to the method and proposed to the user. To this end, the map (optionally together with the height categories) is displayed on the user's end device 4. This display may be movable, rotatable, resizable, for example, or otherwise capable of manipulation. The possible subareas 2 are marked on the map, and the user can select one or more of these subareas 2. Alternatively, the map display on the user's mobile end device 4 may also be used to enable the user to fine tune or adjust the area. For this purpose, the user can specify the location data of selected subarea 2 more precisely, for example. This applies to the size and position on the map of the subarea 2 that is to be cleaned, for example. The user may then agree to a suggestion or specify the parameters thereof more closely according to his wishes.

Communicating a user command regarding selected subarea 2: Device 1 must behave differently with respect to the selected subarea 2 depending on the cleaning or processing action the user wishes device 1 to perform. For example, it may be provided that device 1 travels to the selected subarea 2 and carries out a cleaning or processing activity. Or, it may also be provided that the selected subarea 2 is to be omitted from the cleaning or processing of the room by device 1. In the former case, device 1 travels straight to the subarea 2 in the room selected by the user as soon as subarea 2 has been identified. To do this, device 1 plans a route from its current position to the desired subarea 2, and traverses this route autonomously. Upon reaching the desired subarea 2, device 1 begins the cleaning or processing activity according to the specified size of subarea 2. In this context, various travel strategies may be used, for example device 1 may navigate the subarea 2 to be cleaned/processed in a serpentine pattern.

If the selected subarea 2 is to be omitted from the room cleaning or processing programme by device 1, the position and size of subarea 2 must be stored. In subsequent cleaning or processing passes, device 1 must then adapt its travel strategies to the effect that it does not travel to the selected subarea 2, or does not carry out any cleaning or processing activities there.

REFERENCE SIGNS

1 Device
2 Subarea
3 Photo
4 End device
5 Obstacle
6 Camera

What is claimed is:

1. A method for cleaning or processing a room via an autonomously mobile device, including the method steps:
 Creating a map of the room,
 Storing the map of the room in a data memory,
 Selection of a subarea of the room by a user in that the user takes a photograph of the subarea, Transmitting the photograph containing location data for the selected subarea or transmitting the photograph which can be processed to determine location data for the selected subarea to a processing unit connected to the data memory, Comparing the location data for the selected subarea with the location data contained in the map for identification of the subarea by the processing unit, and Cleaning or processing the room taking into account a user command with regard to the selected subarea, wherein the user takes the photograph using a mobile end device, wherein the map is displayed on the mobile end device, wherein alternatively calculated subareas matching most closely the location data of the subarea selected by the user are marked on the map, and wherein if the subarea selected by the user is not identified unambiguously, the user chooses one of the alternatively calculated subareas.

2. The method according to claim 1, wherein following identification the autonomously mobile device travels to the selected subarea and carries out a cleaning or processing activity.

3. The method according to claim 1, wherein the selected subarea is excluded from the room cleaning or processing activities by the autonomously mobile device.

4. The method according to claim 1, herein the map of the room is stored in the data memory of the autonomously mobile device.

5. The method according to claim 1, wherein the processing unit is contained in the autonomously mobile device.

6. The method according to claim 1, wherein the location data contained in the map includes three-dimensional information, particularly information about the obstacles present in the room.

7. The method according to claim 1, wherein the map of the room is created by the device, and wherein a camera of the device takes single images of adjacent subareas, which are then joined to each other during compilation of the map.

8. The method according to claim 1, wherein the mobile end device is a mobile telephone.

9. The method according to claim 1, herein the processing unit is contained in the mobile end device.

10. A method for cleaning or processing a room via an autonomously mobile device, including the method steps:

Creating a map of the room,

Storing the map of the room in a data memory,

Selection of a subarea of the room by a user in that the user takes a photograph of the subarea, Transmitting the photograph containing location data for the selected subarea or transmitting the photograph which can be processed to determine location data for the selected subarea to a processing unit connected to the data memory, Comparing the location data for the selected subarea with the location data contained in the map for identification of the subarea by the processing unit, and Cleaning or processing the room taking into account a user command with regard to the selected subarea, wherein the user selects a subarea of the room by taking a photograph of the subarea and transmitting it to the processing unit, wherein the user takes the photograph using a mobile end device, wherein the map is displayed on the mobile end device, and wherein if the subarea selected by the user is not identified unambiguously, the user specifies the location data of the selected subarea more precisely by marking the map on the mobile end device as to size and position of the area to be cleaned or avoided in the map.

11. The method according to claim 10, wherein following identification the autonomously mobile device travels to the selected subarea and carries out a cleaning or processing activity.

12. The method according to claim 10, wherein the selected subarea is excluded from the room cleaning or processing activities by the autonomously mobile device.

13. The method according to claim 10, wherein the map of the room is stored in the data memory of the autonomously mobile device.

14. The method according to claim 10, wherein the processing unit is contained in the autonomously mobile device.

15. The method according to claim 10, wherein the location data contained in the map includes three-dimensional information, particularly information about the obstacles present in the room.

16. The method according to claim 10, wherein the map of the room is created by the device, and wherein a camera of the device takes single images of adjacent subareas, which are then joined to each other during compilation of the map.

17. The method according to claim 10, wherein the mobile end device is a mobile telephone.

18. The method according to claim 10, wherein the processing unit is contained in the mobile end device.

* * * * *